C. R. James,

Operating Steam Hammers.

No. 2,461. Reissued Jan. 15, 1867.

United States Patent Office.

CHRISTOPHER R. JAMES AND NATHAN W. CONDICT, JR., OF JERSEY CITY, NEW JERSEY, ASSIGNEES OF C. R. JAMES.

*Letters Patent No.* 55,772, *dated June* 19, 1866; *reissue No.* 2,461, *dated January* 15, 1867.

IMPROVEMENT IN MEANS FOR OPERATING STAMPS AND HAMMERS.

The Schedule referred to in these Letters Patent and making part of the same.

TO ALL WHOM IT MAY CONCERN:

Be it known that we, CHRISTOPHER R. JAMES, and NATHAN W. CONDICT, Jr., both of Jersey City, in the county of Hudson, and State of New Jersey, did obtain Letters Patent of the United States, No. 55,772, bearing date the 19th day of June, 1866, for a new and improved Mode of Operating Stamps and Hammers; and we do hereby declare that the following is a full, clear, and exact description of said invention, reference being had to the accompanying drawing, forming part of this specification, and in which—

Figure 1:
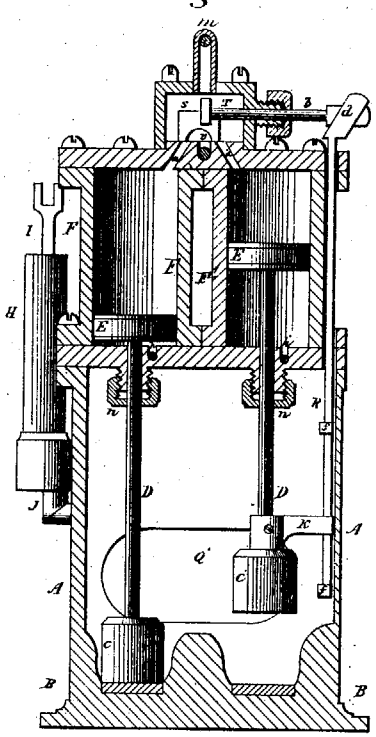
Figure 2:
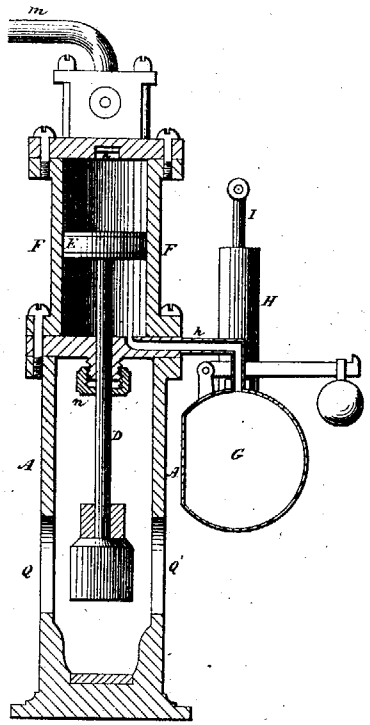

Figures 1 and 2 are vertical sections, at right angles to each other, of a stamping-mill for pulverizing ores, having the invention applied to operate the stamps.

Similar letters of reference indicate corresponding parts in both figures.

This invention consists in operating a stamp or hammer by means of a piston working in a cylinder, the upper end of which is opened at proper intervals, alternately to a steam boiler and to the atmosphere or exhaust, and the lower end of which is in constant communication with a chamber or reservoir of any suitable æriform fluid of sensibly less pressure than that which serves to depress the piston; and said invention further consists in a combination, with two stamps or hammers worked by pistons moving in separate cylinders as above described, of a valve so operated, and passages so controlled by it, so arranged as to bring each cylinder alternately into communication with the boiler, and thereby produce the alternate action of the pistons.

The invention is represented in the drawings as embodied in a stamping-mill with two stamps for pulverizing ores.

A is a frame which supports the other parts of the machine. The stamps are situated within this frame, and in the bottom of the said frame are troughs or mortars, B, into which the ore to be operated upon is introduced through the openings Q. The stamps C C′ are secured to the lower ends of the vertical piston-rods D D′, which pass through stuffing-boxes *n* in the bottom of the cylinders F F′, which are arranged at the top of the frame A, and the said rods are provided at their upper ends with pistons E E′, which are fitted to work tightly in the said cylinders. The lower ends of the cylinders are in constant communication, through pipes *h h′*, with a reservoir of any suitable æriform fluid, such as steam or compressed air, the latter if used being compressed by a pump, H I, to a suitable pressure for raising the pistons and stamps, the said pump being only set in operation to fill the reservoir or make up for any loss of pressure by leakage or accident. This reservoir, G, need only be small, the lower portion of the cylinders F F′ affording in some cases sufficient space. On the top of the cylinders is a valve-chest, T, communicating by a pipe, *m*, with a steam boiler in which there is a pressure of steam largely in excess of that used to lift the pistons, and sufficient by its pressure on the upper sides of the pistons to produce as forcible blows of the stamps as may be desired. In the valve-chest T there is a slide-valve, S, arranged to work over two passages *a a′*, each of which communicates with the upper end of one of the cylinders, and an intermediate port, *v*, communicating with the atmosphere, the said ports being so arranged and the valve so constructed that the latter will open the port *a* or *a′* of one cylinder to the steam in the valve-chest and boiler, while the port *a′* or *a* of the other cylinder is in communication, through the port *v*, with the atmosphere. The valve S may be operated in various ways to admit steam to the upper end of one cylinder, and thereby produce the descent of its piston and stamp, and at the same time permit the exhaust of the steam from the upper end of the other cylinder and permit its piston and stamp to be raised, by the pressure of the æriform fluid acting below the piston. The said valve is represented as being operated by a tappet-arm, K, on the right-hand piston and stamp-rod, D′, the said arm operating between the two tappets, *f f′*, on a vertical rod, R, which slides freely in suitable guides on one of the cylinders on the frame, and the upper end of which is flattened, as shown at *d*, in fig. 1, to work in a slot at the end of the valve-stem, *h*, and has its edges set at a suitable inclination to operate like wedges against the ends of the said slots as the piston E′ completes its stroke upward and downward, and thereby produce a longitudinal movement of the said stem and the valve. When the piston E′ is at the upper end of its stroke, the tappet-arm is in contact with the upper tappet *f′*, the rod R is depressed, and the port *a′* is opened to the steam, and the port *a* open to the atmosphere, and the steam is free to enter the cylinder F′, to produce by its action on the piston E′ the blow of the stamp C′, while the piston E is subject only to the action of the æriform fluid by which it and its respective stamp C are raised. As the piston E′ completes its downward stroke, the tappet-arm K, operating on the tappet *f*, reverses the position of the valve and admits steam to the upper end of the cylinder F, and opens the upper end of the cylinder F′ to the atmosphere, thus allowing the steam to act upon the piston E, and produce the blow of the stamp C, and allowing the piston E and stamp C to be raised by the æriform fluid below. In this way it will be seen that the stamps will be made to operate alternately with a very rapid and forcible action.

The invention may be applied to a hammer in the same way as described with reference to the stamping-mill.

What is here claimed as new and useful, is—

1. In combination with the steam cylinder of a hammer or stamp, a reservoir containing steam, compressed air, or other æriform fluid, of sufficient pressure to elevate the stamp, but of sensibly less than that of the steam in the boiler, when constructed, arranged, and operating substantially as set forth.

2. The arrangement, in combination with two stamps or hammers, worked by pistons moving in separate cylinders, of the valve operated by said stamps or hammers, in the manner described, with passages controlled by it, so arranged as to bring each cylinder alternately into communication with the boiler, and thereby produce the alternate action of the pistons and their attached stamps or hammers, essentially as herein set forth.

C. R. JAMES,
N. W. CONDICT, Jr.

Witnesses:
Henry T. Brown,
A. Le Clerc.